United States Patent
Brown

(10) Patent No.: US 10,692,150 B2
(45) Date of Patent: Jun. 23, 2020

(54) SYSTEM AND METHOD FOR PREDICTIVE ANALYSIS OF CROWD SOURCED DATA FOR PREEMPTIVE LOSS CONTROL

(71) Applicant: Hartford Fire Insurance Company, Hartford, CT (US)

(72) Inventor: Patrick D. Brown, Marlborough, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 1209 days.

(21) Appl. No.: 14/243,206

(22) Filed: Apr. 2, 2014

(65) Prior Publication Data

US 2015/0287142 A1 Oct. 8, 2015

(51) Int. Cl.
| | | |
|---|---|---|
| *G06Q 40/00* | (2012.01) | |
| *G06Q 30/02* | (2012.01) | |
| *G06Q 40/08* | (2012.01) | |
| *G06Q 50/00* | (2012.01) | |

(52) U.S. Cl.
CPC ............. *G06Q 40/08* (2013.01); *G06Q 50/01* (2013.01)

(58) Field of Classification Search
CPC ......... G06Q 40/08; G06Q 40/00; G06Q 40/20
USPC .......................................................... 705/4
See application file for complete search history.

(56) References Cited

U.S. PATENT DOCUMENTS

| | | |
|---|---|---|
| 8,289,160 B1 | 10/2012 | Billman |
| 2008/0034030 A1 | 2/2008 | Toohey |
| 2009/0265193 A1 | 10/2009 | Collins et al. |
| 2011/0161119 A1* | 6/2011 | Collins .................. G06Q 40/08 705/4 |
| 2013/0103823 A1 | 4/2013 | DeJana et al. |
| 2013/0204652 A1 | 8/2013 | Marins et al. |
| 2013/0226624 A1 | 8/2013 | Blessman et al. |
| 2013/0262369 A1 | 10/2013 | Guanwardana et al. |
| 2015/0046194 A1* | 2/2015 | Waddell ................ G06Q 40/04 705/4 |

OTHER PUBLICATIONS

Rapid assessment of disaster damage using social media activity. Kryvasheyau et al. Science Advances. Mar. 11, 2016 (Year: 2016).*
Assessing the utility of social media as a data source for flood risk management using a real-time modelling framework. L. Smith et al. Journal of Floor Risk Management. 10 (2017). p. 370-380. (Year: 2017).*
Predicting Hurricane Damage Using Social Media Posts Coupled with Physical and Socio-Economic Variables. Ma et al. WiPe Paper—Social Media in Crises and Conflicts, Proceedings of the 16th ISCRAM Conference, May 2019. (Year: 2019).*

* cited by examiner

*Primary Examiner* — Alexander G Kalinowski
*Assistant Examiner* — John O Preston
(74) *Attorney, Agent, or Firm* — Howard IP Law Group, PC

(57) ABSTRACT

A crowd sourced based predictive system for detecting and analyzing actuarially significant activity, including high risk activities that may result in damage to an insured property, alerts users of the potential conditions and activities in order to assist with loss control and provide users with the ability to purchase insurance coverages relates to the conditions and activities.

15 Claims, 10 Drawing Sheets

| Policy Identifier | Activity | Location | Coverage | Source(s) |
|---|---|---|---|---|
| 123_AX1 | Turkey Frying | 323 Main Street | Homeowners | Facebook |
| 233_BX1 | Paintball | 444 High Way | Stretch | Instagram, Facebook |
| 678_CX2 | Motorcycle | 123 Broad Street | Accidental Death | Photobucket, Smugmug |
| 123_AX4 | Skydiving | 523 Hartford Lane | Long term disability | Youtube, Facebook, Instagram, ebay |

FIG. 8

SYSTEM AND METHOD FOR PREDICTIVE ANALYSIS OF CROWD SOURCED DATA FOR PREEMPTIVE LOSS CONTROL

BACKGROUND

The insurance industry has implemented several methods to evaluate insurance claims. The evaluation process is often initiated by a "first notice of loss." This generally occurs after a loss has occurred and an insurer is notified of an occurrence that resulted in, for example, damage to a property. Insurers can be notified from various parties, such as, policy holders, police departments or fire departments. Often, a policyholder will then make a claim against an insurance policy due to the alleged loss. Typically, a file will be created and assigned to an insurance representative who will engage in an analytical process to determine if the insured is covered for the type of loss that has occurred and, if so, assess the monetary cost of the damage.

Insurers are often concerned with determining the cause of a loss. The analytical process involved when doing so, is often based on information gathered after an occurrence. This poses a serious problem because of the difficulties associated with assessing how the loss actually occurred. Photographs taken after an occurrence are often used by insurance representatives to make determinations on the cause of loss, for example, associated with a damaged property. However, there are several drawbacks to the use of photographs after a loss has already occurred.

One drawback is that an insurance representative is often required to conduct an on-site visit to the location of the damage, which can be costly and ineffective. When the insurance representative physically goes to the property, each visit can be costly to an insurer. In addition, an insurance representative's use of photographs after-the-fact is often too late to make an accurate determination of what actually caused the loss.

One of the most significant drawbacks of the typical claim evaluation methods used by insurers is that they are backward looking They fail to assess potentially high risk activities policyholders routinely engage in before the loss occurs. While photographs may be helpful to view a damaged property, they fail to provide policyholders with a way to become more aware of their high risk behavior and either alter their behavior or obtain adequate insurance that will potentially cover a claim made due to their behavior.

Accordingly, there is a need for a system and process that compiles and assesses crowd sourced data, such as photographs, that aids in pre-emptively starting the "first notice of loss" process and potentially even preventing such a loss through advance loss control measures.

SUMMARY

The present invention in some embodiments relates to, a system for intelligently compiling and assessing crowd sourced data for insurance operations. The system includes at least one processor; a memory coupled to the at least one processor; and one or more programs, wherein the one or more programs are stored in the memory and configured to be executed by the at least one processor. The one or more programs include instructions for: accessing a plurality of crowd sourced data; evaluating the crowd sourced data to detect one or more instances of actuarially significant circumstances; correlating a location associated with the one or more instances of circumstances with an in force insurance policy; and issuing an electronic communication via an insurance system to a policyholder under the in force insurance policy for the actuarially-significant circumstance.

In some embodiments, the present invention relates to a computer system for processing data for identifying actuarially significant circumstances, comprising: an insurance data computer system comprising: one or more computer processors, and a computer readable medium, accessible by the one or more computer processors, having a computer readable program code embodied therein, said computer readable program code adapted to be executed to implement a method for identifying actuarially significant circumstances. The method comprises: compiling a plurality of real time crowd sourced data including images, text and video; evaluating the crowd sourced data to detect one or more instances of actuarially significant circumstances; correlating the one or more instances of circumstances with an in force insurance policy; and issuing an electronic communication to a policyholder under the in force insurance policy for the actuarially-significant circumstance, wherein the electronic communication includes at least one of a loss control message and an offer for additional insurance coverage. The system further includes a communications device in communication with the insurance data system and in communication with one or more networks for communicating the electronic communication to the policyholder; and an insurance workflow computer in communication with the insurance data system, the insurance workflow computer configured to receive data indicative of the electronic communication, and to determine one or more insurance-related workflow modifications in response to receipt of the data indicative of the electronic communication.

In some embodiments, the present invention relates to a computer-implemented method for intelligent automated assessment of crowd sourced data for insurance purposes. The method includes accessing via a computer network a plurality of real time crowd sourced data including at least two of images, text and video from a plurality of third party web sites; evaluating in a processor the crowd sourced data to detect one or more instances of actuarially significant circumstances related to a potential insurance claim; correlating in the processor a location associated with the one or more instances of circumstances with an in force insurance policy; and issuing via the computer network an electronic communication via an insurance system to a listed policyholder under the in force insurance policy for the activity related to the potential insurance claim, wherein the electronic communication includes at least one of a loss control message and an offer for additional insurance coverage.

BRIEF DESCRIPTION OF THE DRAWINGS

A more detailed understanding may be had from the following description, given by way of example in conjunction with the accompanying drawings wherein:

FIG. 8 shows an exemplary database structure of the present invention.

DETAILED DESCRIPTION

Figure 1:
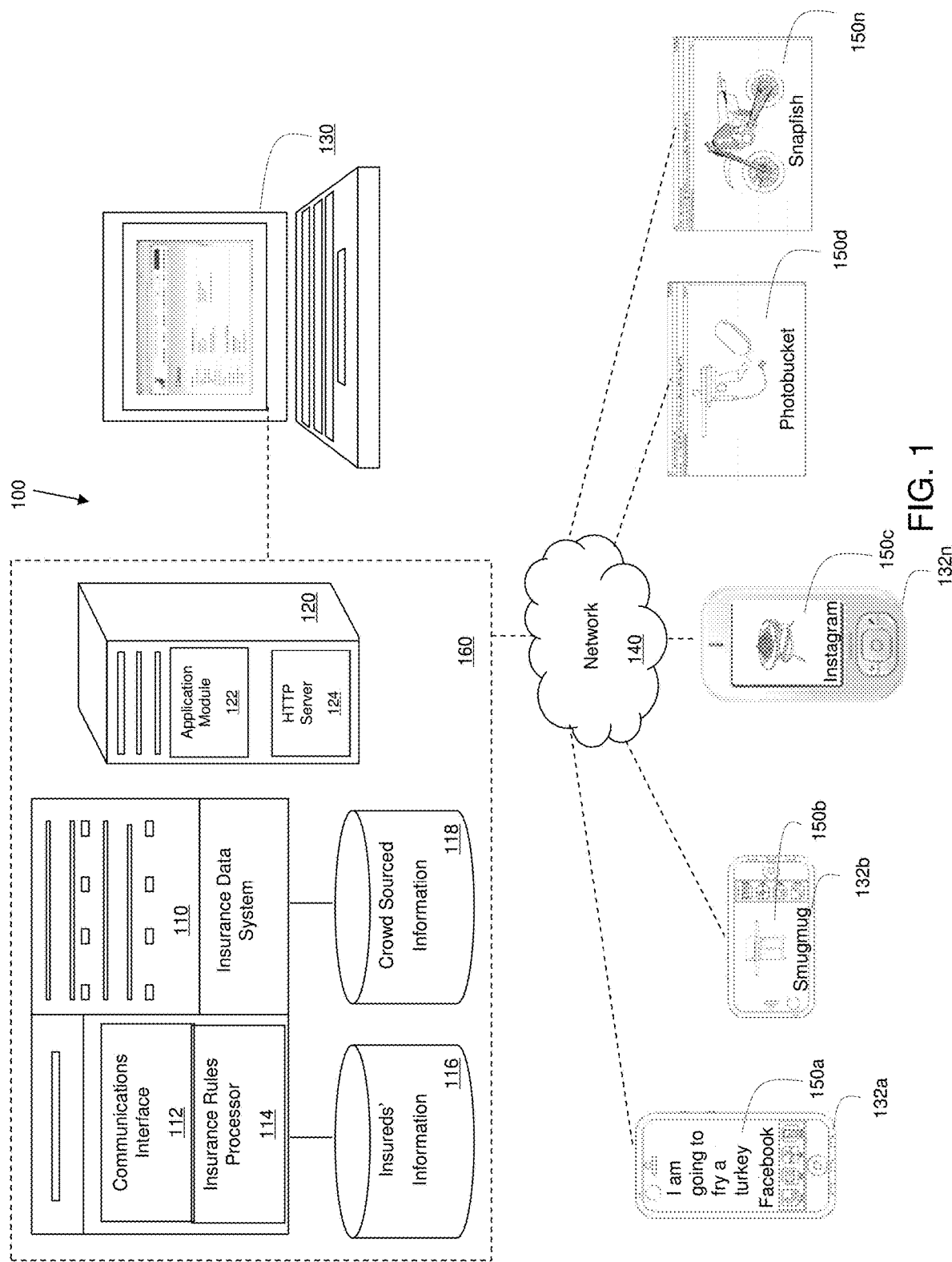
FIG. 1 shows an exemplary computer architecture that may be used for compiling and assessing crowd sourced data administration and management.

Disclosed herein are processor-executable methods, computing systems, and related technologies for the accessing, processing and analyzing of crowd sourced based data for loss control and the predictive management of insurance claims. Loss control and predictive claims management benefits the public and insurance companies as it translates to less injuries and damages for policyholders and lower cost to all parties involved. The present system can preemptively detect certain potential loss conditions and actuarially significant circumstances and immediately alert an affected policyholder, or other interested party, as well as offer the policyholder certain modifications to existing policy coverages to help protect against any losses associated with the detected activity. Generally, the system operates by using crowd sourced based materials available on various social media channels and sites that contain content on various personal or business activities, issues and events. The present system intelligently scans this crowd sourced material to detect certain potential risky or dangerous activity that may lead to a loss or claim. The system generates certain loss control messages that are sent to the relevant policyholders along with offers of certain additional coverages if applicable to provide insurance coverage related to the potential loss event or activity. For example, if the system detects that a business is engaging in certain activity that may increase the chance that a flood occurs, then the business may be sent a warning message along with an offer for insurance with flood protection coverage. In another example, if the system detects that an individual is engaging in risky recreational activity at their home, the system may send the individual an offer for an umbrella coverage policy for additional coverage for the activity.

Loss control is historically performed manually by a loss control consultant that works for an insurance company. The loss control consultant will physically visit and survey insureds such as individuals and/or or businesses for property or casualty (general liability, automobile, home, workers compensation, etc.) exposures, identifying existing and potential exposures and how insureds can control these existing or potential exposures or risks.

Using embodiments of the present invention, loss control is automated using crowd sourced data so that insurance companies can efficiently and intelligently perform loss control services remotely and accurately. Policyholders are also given the opportunity to purchase additional coverage under embodiments of the present invention and thereby may benefit from additional protection for their families, homes, cars and businesses.

The term "crowd-sourced" as used herein relates to web based public data such as pictures, videos, text and combinations of the aforementioned that is collected or accessed, either in response to a request or by obtaining data from one or more repositories of data. The crowd sourced data is generally obtained from a large number of individuals or individual providers of data. The providers are not necessarily requested in advance to provide the data. The persons requested to provide the data may exclude, or include primarily persons other than, those with an existing business arrangement with the insurance company, such as insurance company employees, contractors, agents, policy holders, adjusters and the like.

The term "actuarially-significant" as used herein means any item of information that would indicate that the risk profile is not commensurate with premiums charged. Actuarially significant information includes any information, knowledge of which by an insurance company might cause the insurance company to adjust a premium or other policy term or cancel a policy. An actuarially significant circumstance includes activities by an insured, planned or proposed activities by an insured, a condition or feature of an insured property, including a building or other structure or a vehicle, an omission or failure to abide by recommended safety practices or guidelines, and other intended or actual conditions, actions, situations, materials, arrangements of materials, mechanisms, machines, devices and other conditions. Non-limiting examples of actuarially-significant conditions include: unsafe repairs at an insured property, recommended repairs or maintenance at an insured property that have not been conducted, and repairs or maintenance at an insured property conducted by individuals or entities lacking appropriate qualifications, training, tools and/or materials.

Generally many people take digital pictures with their camera phones or similar devices and post them on electronic social networking or social media sites like Smugmug, SnapChat, Twitter, Facebook, Instagram, Google+, etc. These photos are generally taken with mobile devices such as smartphones which may also embed geographic information system (GIS) data or any type of methodology or system designed to capture, store, manipulate, analyze, manage, and present all types of geographical data, which may be referred to herein as "geocoded data" or "location based data," related to each photo.

Utilizing embodiments of the present invention, insurance companies can predictively and proactively contact the insured to prevent further loss and/or provide them with recommended options for certain coverages related to the potential loss conditions and activities in the crowd sourced data.

FIG. 1 shows an example system architecture 100 that may be used for loss control and the predictive administration and management of insurance claims using crowd sourced data. The example architecture 100 includes an insurance data system 110, a web system 120, an insurance terminal 130, user devices 132*a-n*, a network 140, and a plurality of third party web based systems 150*a-n*. Insurance data system 110 may include a communications interface 112, an insurance rules processor 114, an insureds information database 116 and crowd sourced information database 118 that comprise an insurance company subsystem 160.

In one embodiment, insurance rules processor 114 may include one or more predictive models for determining whether certain behavior or activity will likely rise to a claim or necessitates loss control procedures. The insurance rules processor 114 may use the one or more predictive models to evaluate the crowd sourced data of crowd sourced information database 118 to detect one or more instances of activity related to a potential insurance claim. A predictive model takes into account a plurality of parameters, and in embodiments may take into account any number of parameters, such as up to 10 parameters, up to 100 parameters, or more parameters. The predictive model may include one or more of neural networks, Bayesian networks (such as Hidden Markov models), expert systems, decision trees, collections of decision trees, support vector machines, or other systems known in the art for addressing problems with large numbers of variables. Preferably, the predictive model is trained on prior data and outcomes known to the insurance company. The specific data and outcomes analyzed vary depending on the desired functionality of the particular predictive model. The particular data parameters selected for analysis in the training process are determined by using regression analysis and/or other statistical techniques known in the art for identifying relevant variables in multivariable systems.

In other embodiments, one or more decision trees, equations or tables may be included with and executed by insurance rules processor 114. Decision trees may include decisions relating to identified terms and phrases and equivalent terms and phrases, in accordance with text based analysis principles.

In one embodiment, insurance terminal 130, user devices 132a-n, third party web based systems 150a-n and insurance company subsystem 160 are in communication via a network 140. Insurance company subsystem 160 shown in FIG. 1 is an embodiment of a subsystem that might be implemented solely within the corporate office headquarters of a financial services/insurance company or be an aggregation of one or more other subsystems including one or more partner, third party administrator and/or vendor subsystems to allow communications and data transfer between the insurance company and claims representatives, adjusters, insurance customers, and insurance agents. Data transferred through network 140 to insurance subsystem 160 may pass through one or more firewalls or other security type controls implemented within web system 120 and/or in standalone devices. The firewall allows access to network 140 only through predetermined conditions/ports. In another embodiment, the firewall restricts the Internet IP addresses that may access web system 120.

In operation, insurance subsystem 160 may implement spider/webcrawler technology to search via network 140 for data such as crowd sourced data in the form of digital photographs, text, videos and associated location based information on third party web systems 150a-n that have been uploaded to third party web systems 150a-n by a plurality of third parties. Insurance subsystem 160 may also communicate with user devices 132a-n to obtain data such as digital photographs and associated geocoded data directly from one or more users.

Referring to FIG. 1 still, insurance rules processor 114 may include one or more business rules and one or more predictive models, decision trees, equations and/or tables, in conjunction with one or more software modules or objects and one or more specific-purpose processor elements, to perform the processing required by embodiments of the present invention such as for evaluating crowd sourced data to detect one or more instances of activity related to a potential insurance claim, correlate the one or more instances of activity with an in force insurance policy, and issuing an electronic communication to a policyholder under the in force insurance policy for the one or more instances of activity. In embodiments, the correlating may include determining location data associated with the detected one or more instances of activity, and correlating a location associated with the one or more instances of activity with an in force insurance policy. In other embodiments, the correlating may include correlating other data relating to the one or more instances of activity to data associated with the in force insurance policy. The correlating may be based on correlating name data, such as correlating name data of an individual who posted the information, or name data mentioned in the posted data, with a name of an insured or property owner. Correlating may be performed using both name data and location data.

The insureds' information database 116 may store information, data and documents that relate to insureds' policies such as home, business and/or automobile related policy information as well as location information. Crowd sourced information database 118 may store information, data and documents from user devices 132a-n and third party systems 150a-n. Insureds' information database 116 and crowd sourced information database 118 may be spread across one or more computer-readable storage media, and may be or include one or more relational databases, hierarchical databases, object-oriented databases, one or more flat files, one or more spreadsheets, and/or one or more structured files. Insureds' information database 116 and crowd sourced information database 118 may be managed by one or more database management systems (not depicted), which may be based on a technology such as Microsoft SQL Server, MySQL, Oracle Relational Database Management System (RDBMS), PostgreSQL, a NoSQL database technology, and/or any other appropriate technology.

Communication between the insurance data system 110 and the other elements in the example architecture 100 of FIG. 1 may be performed via the communications interface module 112 interacting within insurance data subsystem 160. The insurance data subsystem 160 may access and communicate with user devices 132a-n and third party systems 150a-n via communications interface 112.

Referring still to FIG. 1, web system 120 may provide a web interface that may be accessed directly by a user such as an insured, a claims representative, an insurance adjuster and other third party entity employing user devices 132a-n to communicate and interact with an insurance company representative employing terminal 130. In embodiments, an insurance adjuster or claims adjuster may use crowd-sourced data to determine and provide a recommendation for payment on a claim. In certain embodiments, user devices 132a-n and terminal 130 can include, but are not limited to cellular telephones, other wireless communication devices, personal digital assistants, pagers, laptop computers, tablet computers, smartphones, other mobile display devices, or combinations thereof. In embodiments of the present invention, devices 132a-n and terminal 130 may communicate with the web site system 120 that may be operated by or under the control of an insurance entity or other third party entity such as an outsourced type entity or third party administrator type entity. The web site system 120 may generate one or more web pages for access by client devices 132a-n and requesting user device 130, and may receive responsive information from client devices 132a-n such as certain requested coverage and policy information. The web site system 120 may then communicate this information to the insurance data system 110 for processing via communications interface 112.

The web site system 120 may include a web application module 122 and a HyperText Transfer Protocol (HTTP) server module 124. The web application module 122 may generate the web pages that make up the web site and that are communicated by the HTTP server module 124. Web application module 122 may be implemented in and/or based on a technology such as Active Server Pages (ASP), PHP: Hypertext Preprocessor (PHP), Python/Zope, Ruby, any server-side scripting language, and/or any other appropriate technology.

The HTTP server module 124 may implement the HTTP protocol, and may communicate HyperText Markup Language (HTML) pages and related data from the web site to/from client devices 132a-n and 130 using HTTP. The HTTP server module 124 may be, for example, a Sun-ONE Web Server, an Apache HTTP server, a Microsoft Internet Information Services (IIS) server, and/or may be based on any other appropriate HTTP server technology. The web site system 120 may also include one or more additional components or modules (not depicted), such as one or more switches, load balancers, firewall devices, routers, and devices that handle power backup and data redundancy.

Referring still to FIG. 1, one or more of the client devices 132a-n such as client device 132a may include a web browser module 134, which may communicate data related to the web site to/from the HTTP server module 124 and the web application module 122 in the web site system 120. The web browser module 134 may include and/or communicate with one or more sub-modules that perform functionality such as rendering HTML (including but not limited to HTML5), rendering raster and/or vector graphics, executing JavaScript, and/or rendering multimedia content. Alternatively or additionally, the web browser module 134 may implement Rich Internet Application (RIA) and/or multimedia technologies such as Adobe Flash, Microsoft Silverlight, and/or other technologies. The web browser module 134 may implement RIA and/or multimedia technologies using one or web browser plug-in modules (such as, for example, an Adobe Flash or Microsoft Silverlight plugin), and/or using one or more sub-modules within the web browser module 134 itself. The web browser module 134 may display data on one or more displays that are included in or connected to the client device 132a, such as a liquid crystal display (LCD) display, organic light-emitting diode (OLED) display, touch screen or monitor. The client device 132a may receive input from the user of the client device 132a from input devices (not depicted) that are included in or connected to the client device 132a, such a mouse or other pointing device, or a touch screen, and provide data that indicates the input to the web browser module 134.

The example architecture 100 of FIG. 1 may also include one or more wired and/or wireless networks within subsystem 160 via which communications between the elements and components shown in the example architecture 100 may take place. The networks may be private or public networks, cloud or shared networks and/or may include the Internet.

Each or any combination of the components/modules 112, 114, 122, and 124 shown in FIG. 1 may be implemented as one or more software modules or objects, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 1, these modules 112, 114, 122, and 124 may perform functionality described later herein.

Figure 2:
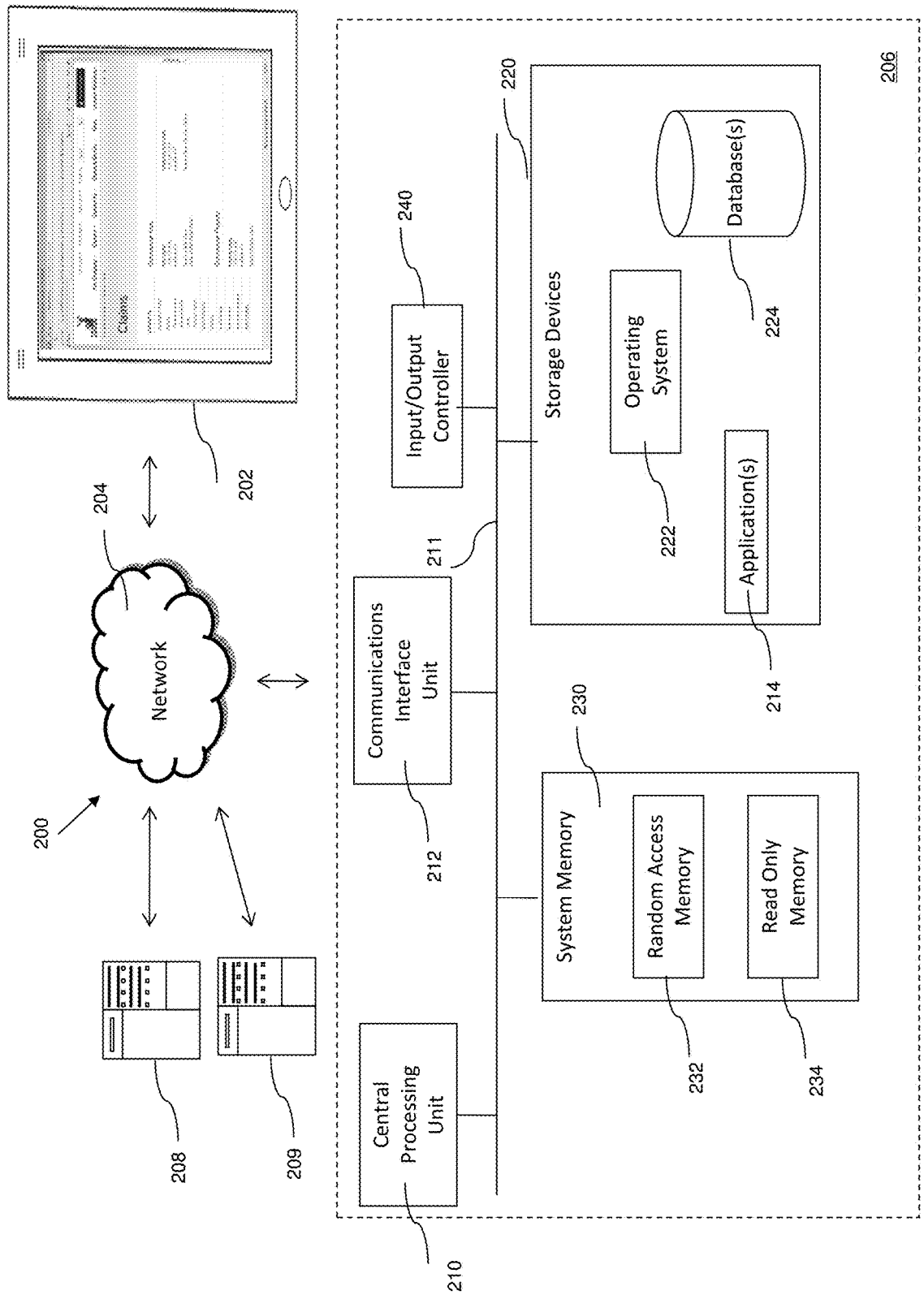
FIG. 2 shows an exemplary system that may be used for the management and analysis of crowd source data for insurance purposes.

Referring to FIG. 2, an exemplary computer system 200 for use in an implementation of the invention will now be described. Computer system 200 may be configured to perform loss control services and claims evaluation and management for one or more insurance companies and their associated agents, personnel, customers and staff using devices 202. System 200 may include device 202, which may be an insurance company agent or customer terminal or device, a network 204, an insurance processing and data system 206 and one or more third party servers 208 and 209. In embodiments of the present invention, insurance processing and data system 206 is responsible for the processing of potential claims related data such as image, video and text data, including crowd sourced based data, from third party servers 208 and 209. Third party servers may be administered by third party web operators or social media server operators. In insurance processing and data system 206, a central processing unit or processor 210 executes instructions contained in programs such as policy management application program 214, stored in storage devices 220. Processor 210 may provide the central processing unit (CPU) functions of a computing device on one or more integrated circuits. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Storage devices 220 may include suitable media, such as optical or magnetic disks, fixed disks with magnetic storage (hard drives), tapes accessed by tape drives, and other storage media. Processor 210 communicates, such as through bus 211 and/or other data channels, with communications interface unit 212, storage devices 220, system memory 230, and input/output controller 240. System memory 230 may further include non-transitory computer-readable media such as a random access memory 232 and a read only memory 234. Random access memory 232 may store instructions in the form of computer code provided by application 214 to implement embodiments of the present invention. One or more computer programs may be stored in memory, or computer usable media, such as storage devices 220 and random access memory 232, in the form of computer readable program code adapted to be executed by at least one processor, such as a processor central processing unit 210. The one or more computer programs may include instructions for performing steps of methods of embodiments of the invention described herein. System 200 further includes an input/output controller 240 that may communicate with processor 210 to receive data from user inputs such as pointing devices, touch screens, and audio inputs, and may provide data to outputs, such as data to video drivers for formatting on displays, and data to audio devices.

Storage devices 220 are configured to exchange data with processor 210, and may store programs containing processor-executable instructions, and values of variables for use by such programs. Processor 210 is configured to access data from storage devices 220, which may include connecting to storage devices 220 and obtain data or read data from the storage devices, or place data into the storage devices. Storage devices 220 may include local and network accessible mass storage devices. Storage devices 220 may include media for storing operating system 222 and mass storage devices such as storage 224 for storing data related to crowd-sourced data, including GIS data and other located based data, in force insurance policy data including location data, such as physical address data, and address data such as telephone number data and e-mail address data, predictive model data, and claims related data.

Communications interface unit 212 may communicate via network 204 with other computer systems such as third party servers 208 and 209 as well as other internal and external servers, computer systems of remote sources of data, and with systems for implementing instructions output by processor 210. Insurance processing and data system 206 may also be configured in a distributed architecture, wherein databases, data storage devices and processors are housed in separate units or locations. The servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SASTM, ATP, Bluetooth, GSM and TCP/IP. Network 204 may be or include wired or wireless local area networks and wide area networks, and over communications between networks, including over the Internet.

One or more public cloud, private cloud, hybrid cloud and cloud-like networks may also be implemented, for example, to handle and conduct processing of one or more transactions or processing of embodiments of the present invention. Cloud based computing may be used herein to handle any one or more of the application, storage and connectivity requirements of embodiments of the present invention. For example one or more private clouds may be implemented to handle crowd sourced data and in force policy data of embodiments of the present invention. Furthermore, any suitable data and communication protocols may be employed to accomplish the teachings of embodiments of the present invention.

Figure 3:
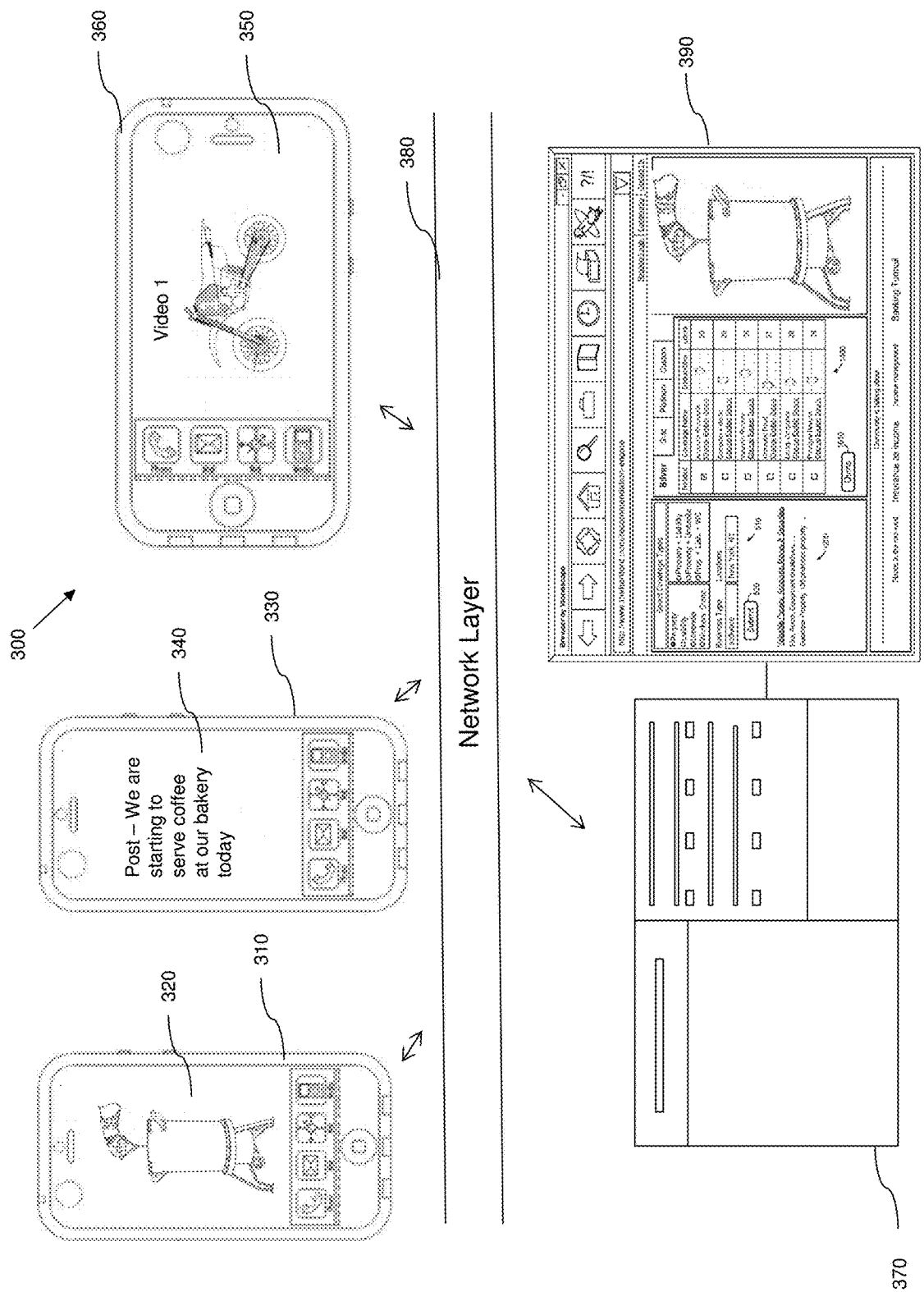
FIG. 3 shows another exemplary system of the present invention.

FIG. 3 illustrates another exemplary system 300 of an insurance risk management and preemptive claims system as discussed with respect to FIGS. 1 and 2. System 300 includes one or more mobile devices 310, 330 and 350 that may independently post or upload one or more images, videos or text 320, 340 and 360 up to one or more websites like Picasa, Snapfish, Flickr, SmugMug, Facebook, Twitter, MySpace, Instagram and Pinterest among others. Such images, videos or text 320, 340 and 360 may be part of a personal or commercial posting such as one of a social network type site, business related site or compiled via a third party information service. Server 370 is configured to access and compile such images, videos and/or text 320, 340 and 360 via a network layer 380. For example, certain web crawling and scraping technology may be employed on server 370 for searching for crowd sourced based data such as photos, videos and text uploaded from mobile devices 310, 330 and 350 and using location based data such as GIS meta-data contained in each photo or video to determine if the location is associated with an in force insurance policy associated with a current personal or commercial policyholder. The server 370 may be configured to evaluate the crowd sourced data to detect one or more instances of activity that is actuarially significant or related to a potential insurance claim. The identification of crowd sourced based data having a location associated with an in force insurance policy, and the detection of one or more instances of activity that is actuarially significant or related to a potential insurance claim, may take place in any order. The server 370 may be configured to evaluate crowd sourced data in real time as the data is loaded onto websites and social media networks, identify actuarially significant activity, correlate locations with the actuarially significant activity, correlate in force policies with the locations of the actuarially significant activity, determine whether the present coverages, limits, exclusions and other terms and features of the in force policies are such that a communication of an offer or information regarding additional coverage is proper, and provide the communication of loss control data or an offer in real time. In embodiments, the real time nature of the processing may result in the loss control communication or communication of an offer to be made within less than 15 minutes, 30 minutes, or an hour of the uploading of the crowd sourced data to social media or other resource accessible to the server 370. Location based data such as GIS data may be compared with addresses of policyholders to correlate or determine matches between the GIS data and addresses of policyholders. Server 370 is configured to provide loss control warning messages and coverage recommendations to policyholders such as via coverage recommendation screen 390 that may be viewed on mobile devices 310, 330 and 350. Coverage recommendation screen 390 may provide coverage recommendations such as personal lines, consumer, commercial, auto, home, business, umbrella and other types of products and coverage that may be viewed on mobile devices 310, 330 and 350 for selection and purchase. The coverage recommendations may include offers for additional insurance coverage. The offers may include a rider for additional coverage, an endorsement, such as a stretch endorsement, a change in coverage limits or exclusions, such as an increase in limits or a removal or conditioning of exclusions. Systems of embodiments of the present invention may be configured to determine, based on the crowd sourced data and associated activities, rules correlating activities to recommended types of coverage, limits and exclusions, and data indicative of coverages, limits and exclusions under in force policies, to determine coverages and changes in limits and exclusions to be recommended to the policyholder.

It is contemplated that the crowd sourced data such as images, videos or text 320, 340 and 360 utilized in embodiments of the present invention generally may be geocoded or geotagged. Geotagging results in the photo having accessible geographical identification metadata that usually consists of latitude and longitude coordinates, as well as altitude, bearing, distance, accuracy data, and place names. Geotagging can assist in embodiments of the present invention by have the insurance subsystem search for images taken at an insured property location by entering latitude and longitude coordinates into a suitable image search engine. Location identification may also include geocoding or using non-coordinate based geographical identifiers, such as a street address, name of a business, non-profit, facility, individual or landmark associated with the location and finding associated geographic coordinates for the photos or data in embodiments of the present invention.

Generally, data or photos may be accessed and stored in a variety of formats including the JPEG file format where the geotag information will be typically embedded in the metadata stored in Exchangeable image file format (EXIF) or Extensible Metadata Platform (XMP) format. Location information such as latitude and longitude may be stored in units of degrees with decimals, such as in the form of global positioning coordinates, such as Global Positioning System (GPS) Latitude: 81 deg 48' 15.73" S; GPS Longitude: 19 deg 15' 27.74" W; GPS Position: 47 deg 28' 62.31" S, 11 deg 14'

36.78" E or alternatively location information could also be presented in formats such as: GPS Latitude 92.32212; GPS Longitude: 20.14436 and GPS Position: 47.65611 11.21113. This location or geo data is then matched or linked with policyholder data of record with an insurance company such as an insured property. For example, a photograph that has coordinates or location data that matches with a physical address of an insured property will be deemed to be indicative of conditions or activity at that property.

Figure 4:
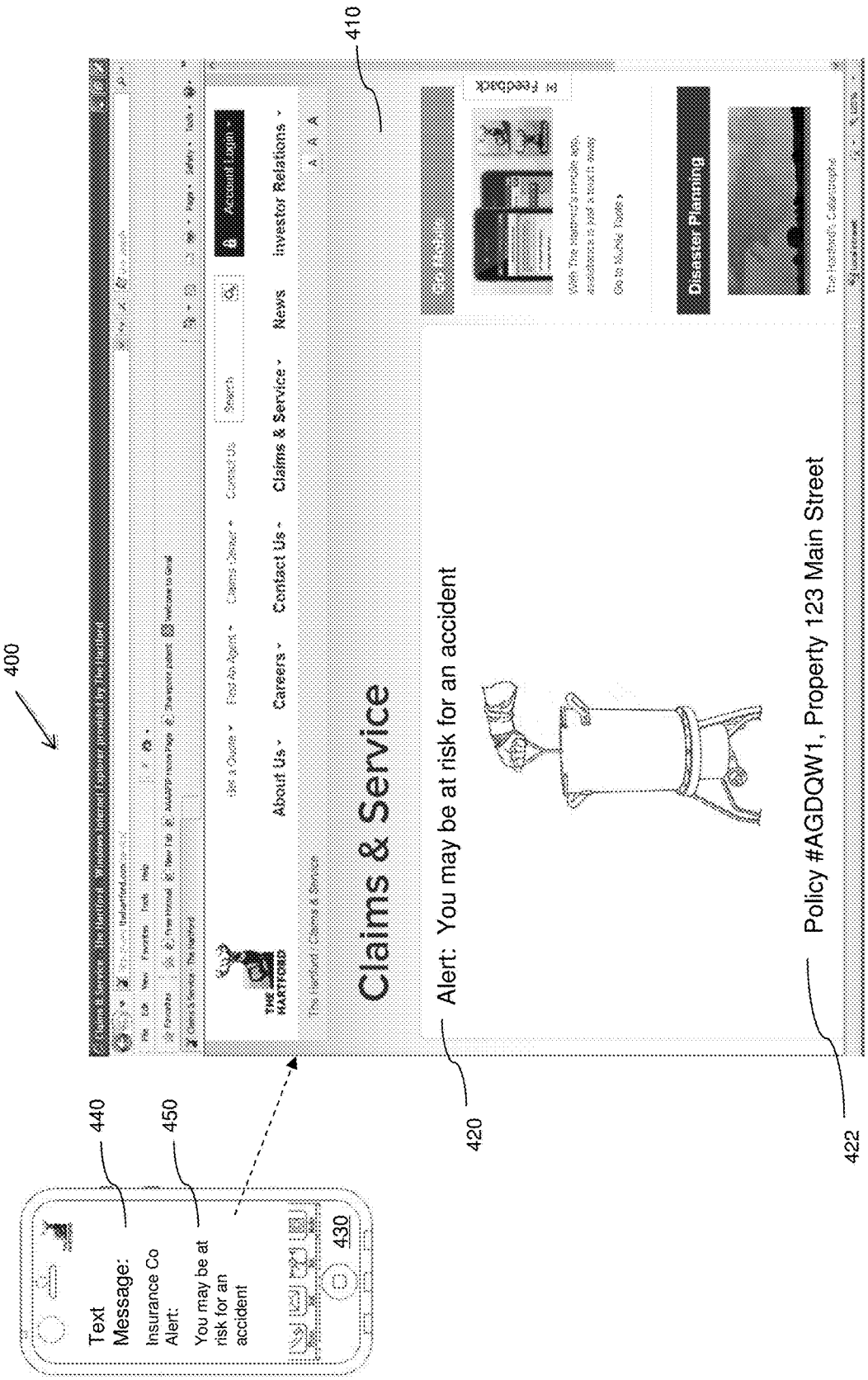
FIG. 4 shows an exemplary screen providing a communication to a policyholder in an embodiment of the present invention.

FIG. 4 illustrates an exemplary screen configuration 400 of an insurance loss control and preemptive claims management system as discussed with respect to FIGS. 1, 2 and 3. Screen 400 is configured to interface with a user such as an insurance company customer for loss control and for administering and managing preemptive claim activities and issues. Screen 400 includes a display area 410 that may include one or more warning messages 420 that relate to the crowd sourced data that has been analyzed. Screen 400 may also identify one or more in force policies 422 that relate to the location of the potential claim activity. Screen 400 may interface with a mobile device 430 that includes a screen 440 for displaying all or portions of and interacting with screen 400 for the display of a loss control message 450. The loss control message may be delivered via SMS (Short Message Service) and MMS (Multimedia Messaging Service or via electronic mail or via a hyperlink to page 410. The loss control message 450 may reference the risky or actuarially significant activity such as the picture of turkey frying or other activity that was determined to be actuarially significant and/or a potential loss or claim. The loss control message 450 may include tips for preventing the loss, a warning or other text or graphics to help the user with preventing the loss or protecting against the loss.

Figure 5:
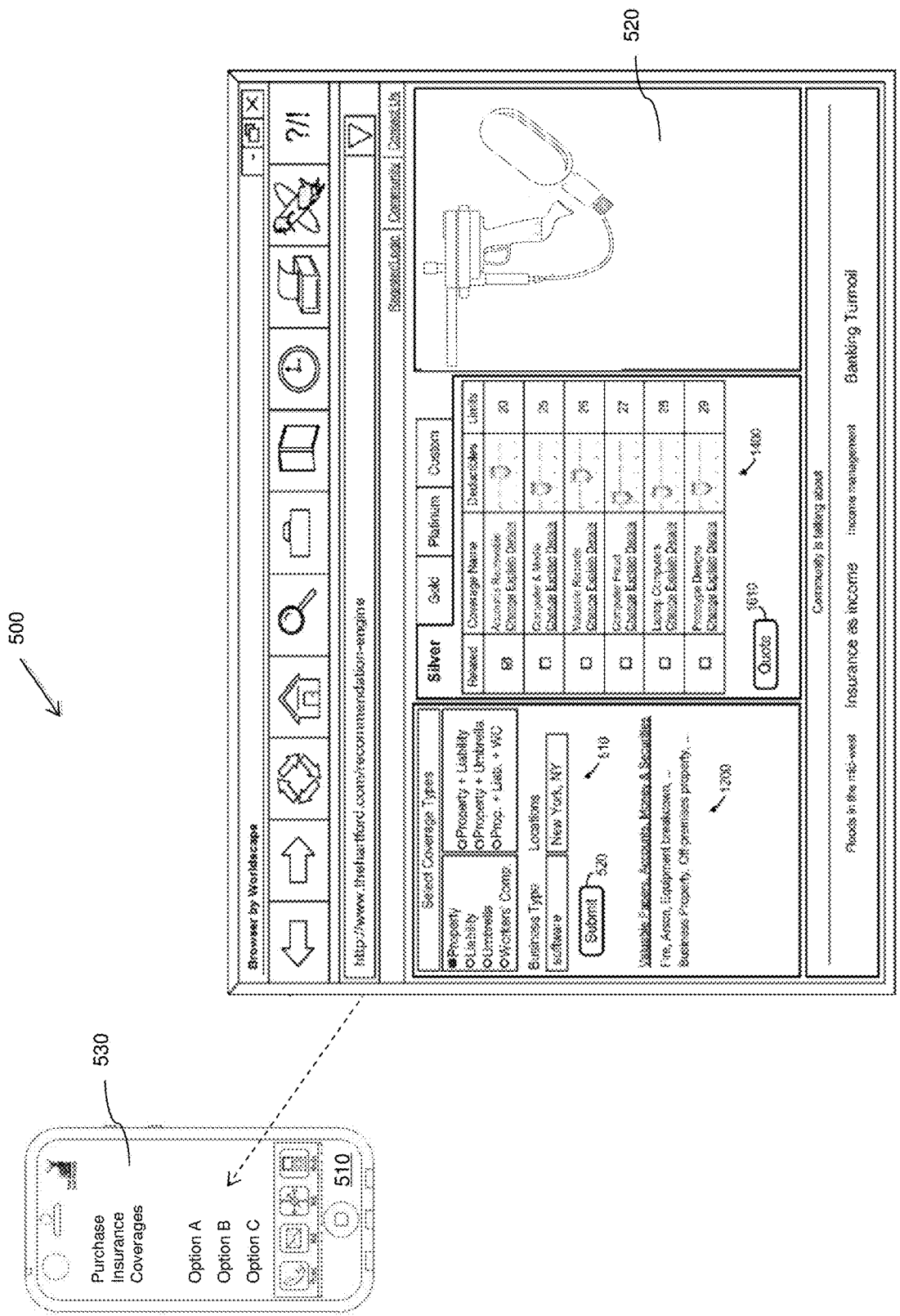
FIG. 5 shows an exemplary screen providing a recommendation of one or more insurance coverages in an embodiment of the present invention.

FIG. 5 illustrates another exemplary system screen configuration 500 of an insurance loss control and preemptive claims management system as discussed with respect to FIGS. 1-4. System screen 500 is configured to interface with a user such as a policyholder operating mobile device 510 for insurance coverage recommendation, selection and purchase in accordance with embodiments of the present invention. Generally, the user will be provided an alert type message as discussed with respect to FIG. 4 and then the user would then be provided with insurance recommendations for coverage(s) related to the risk activity detected. Insurance coverage recommendation, selection and purchase may be accomplished via a web based recommendation, selection and purchase site 520 that is configured to provide recommendations as to the particular preemptive claims issue and/activity. For example, in a commercial context, a Business Owners Policy (BOP) may be recommended in instances where the crowd sourced data indicates that a particular business is engaging in certain activity deemed to be actuarially significant. A BOP generally provides three types of coverage such as property insurance that covers buildings and contents owned or leased, liability protection that covers the business in the event it is found responsible for causing harm to a person and/or property and business interruption insurance that covers the loss of income when the business is not operational due to unexpected damage or events. One or more of these coverages or other related optional coverages or stretch endorsements may be offered to a policyholder via screen 520. The selected coverage may be purchased and the policy binded via screen 530 through user operating device 510. Users may also be universally offered umbrella insurance coverage or liability insurance that is in excess of specified other policies.

Figure 6:
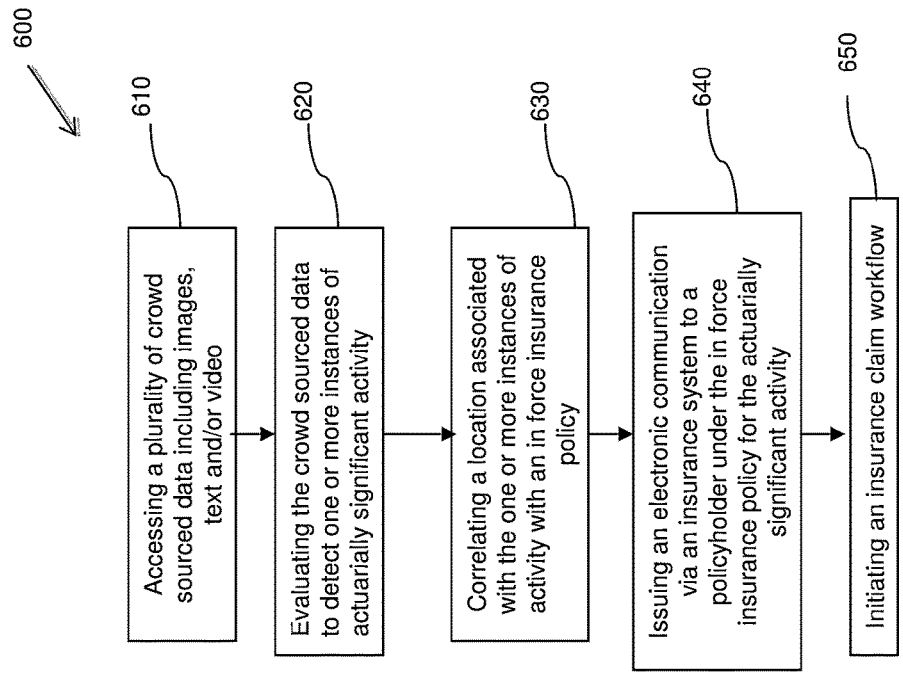
FIG. 6 shows an exemplary process flow of an embodiment of the present invention.

FIG. 6 illustrates an exemplary computerized method 600 of the present invention. In one embodiment, the method 600 includes accessing a plurality of crowd sourced data including images, text and/or video, step 610. The method continues with evaluating the crowd sourced data to detect one or more instances of activity related to a potential insurance claim, step 620. Evaluation may use image scanning, image analysis and/or text mining to determine the content of the crowd sourced data and match the data with one or more predetermined ratings and/or categories as far as riskiness or actuarially significant types of activities. Evaluation of text data may include natural language processing techniques, including techniques such as identification of root words and comparison of root words to one or more listings of words identified as having actuarial significance. Evaluation may include use of predictive models, Boolean text analysis, image analysis, and voice data analysis, to detect data that indicates actuarially significant or risky activity. Analysis may include identification of activities such as repairs or modifications to a structure by persons lacking appropriate qualifications or training, such as social media or other posts indicative of a property owner discussing do it yourself projects involving plumbing and electrical installation and modifications. Key words and image analysis may be included in techniques to identify such do it yourself projects. Identification may include identifying evidence of business activities not covered by a policy, such as third party postings to social media regarding services purchased and offered, such as postings regarding an insured business's appliance installation services, where the business' policy covers only appliance sales.

The method further continues with correlating a location associated with the one or more instances of activity with an in force insurance policy, step 630. The method further continues with issuing an electronic communication via an insurance claims system to a listed policyholder under the in force insurance policy for the activity related to the potential insurance claim, step 640. The electronic communications may be communicated in any manner, including text message, e-mail, notification via one or more apps, such as one or more mobile phone based apps, notification via a social network or other resource used to collect data, or otherwise.

The method continues with initiating an insurance claim workflow, step 650. The insurance claim workflow or process may include a first First Notice of Loss (FNOL) type of process to initially record and report claims to respective insurance carriers where generally previously an agent would complete one or more FNOL forms or intake type forms in the respective insurance system. In embodiments of the present invention, a preemptive or initial FNOL type process may occur once certain activity is detected via the crowd sourced data.

Figure 7:
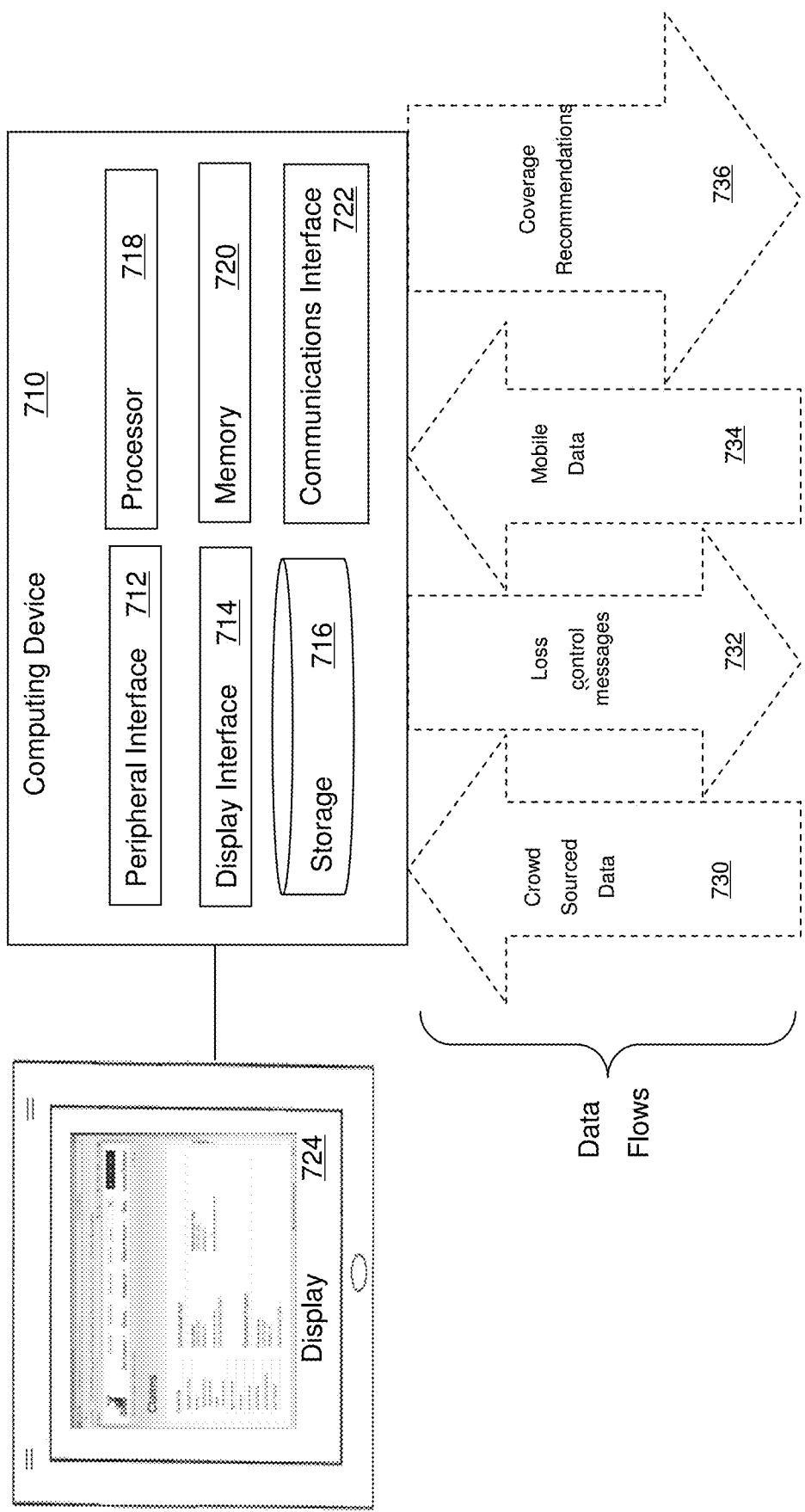
FIG. 7 shows an exemplary device and associated data flows in an embodiment of the present invention.

FIG. 7 shows an example computing device 710 that may be used to implement features describe above for managing preemptive claims related data in accordance with embodiments of the present invention. The computing device 710 may include a peripheral device interface 712, display device interface 714, a storage device 716, a processor 718, a memory device 720, and a communication interface 722. Computing device 710 may be coupled to a display device 724, which may be separately coupled to or included within the computing device 710. In operation, computing device 710 is configured to receive and transmit a number of data flows via communications interface 722 including, for example, crowd sourced data 730 as from a variety of social network sites, loss control messages 732, mobile data from policyholder device(s) 734 and coverage recommendations 736 that relate to the crowd sourced data 730.

The peripheral device interface 712 may be an interface configured to communicate with one or more peripheral devices. The peripheral device interface 712 may operate using a technology such as Universal Serial Bus (USB), PS/2, Bluetooth, infrared, serial port, parallel port, and/or other appropriate technology. The peripheral device interface 712 may, for example, receive input data from an input device such as a keyboard, a mouse, a trackball, a touch screen, a touch pad, a stylus pad, and/or other device. Alternatively or additionally, the peripheral device interface 712 may communicate output data to a printer that is attached to the computing device 710 via the peripheral device interface 712.

The display device interface 714 may be an interface configured to communicate data to display device 724. The display device 724 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 714 may operate using technology such as Video Graphics Array (VGA), Super VGA (S-VGA), Digital Visual Interface (DVI), High-Definition Multimedia Interface (HDMI), or other appropriate technology. The display device interface 714 may communicate display data from the processor 718 to the display device 724 for display by the display device 724. As shown in FIG. 7, the display device 724 may be external to the computing device 710, and coupled to the computing device 710 via the display device interface 714. Alternatively, the display device 724 may be included in the computing device 710.

The memory device 720 of FIG. 7 may be or include a device such as a Dynamic Random Access Memory (D-RAM), Static RAM (S-RAM), or other RAM or a flash memory. The storage device 716 may be or include a hard disk, a magneto-optical medium, an optical medium such as a CD-ROM, a digital versatile disk (DVDs), or Blu-Ray disc (BD), or other type of device for electronic data storage.

The communication interface 722 may be, for example, a communications port, a wired transceiver, a wireless transceiver, and/or a network card. The communication interface 722 may be capable of communicating using technologies such as Ethernet, fiber optics, microwave, xDSL (Digital Subscriber Line), Wireless Local Area Network (WLAN) technology, wireless cellular technology, and/or any other appropriate technology.

An instance of the computing device 710 of FIG. 7 may be configured to perform any feature or any combination of features described above as performed by user devices 132a-n as described with respect to FIG. 1. In such an instance, the memory device 720 and/or the storage device 716 may store instructions which, when executed by the processor 718, cause the processor 718 to perform any feature or any combination of features described above. Alternatively or additionally, in such an instance, each or any of the features described above may be performed by the processor 718 in conjunction with peripheral device interface 712, display device interface 714, and/or storage device 716, memory device 720, and communication interface 722.

Alternatively or additionally, an instance of the computing device 710 may be configured to perform any feature or any combination of features described above as performed by the insurance data system 110. In such an instance, the memory device 720 and/or the storage device 716 may store instructions which, when executed by the processor 718, cause the processor 718 to perform any feature or any combination of features described above as performed by the interface module 112 and/or the insurance or business rules module 114. In such an instance, the processor 718 may perform the feature or combination of features in conjunction with the memory device 720, communication interface 722, peripheral device interface 712, display device interface 714, and/or storage device 716.

Alternatively or additionally, an instance of the computing device 710 may be configured to perform any feature or any combination of features described above as performed by the web site system 120. In such an instance, the memory device 720 and/or the storage device 716 may store instructions which, when executed by the processor 718, cause the processor 718 to perform any feature or any combination of features described above as performed by the web application module 122 and/or the HTTP server module 124. In such an instance, the processor 718 may perform the feature or combination of features in conjunction with the memory device 720, communication interface 722, peripheral device interface 712, display device interface 714, and/or storage device 716.

Although FIG. 7 shows that the computing device 710 includes a single processor 718, single memory device 720, single communication interface 722, single peripheral device interface 712, single display device interface 714, and single storage device 716, the computing device may include multiples of each or any combination of these components 712, 714, 716, 718, 720, and 722 and may be configured to perform analogous functionality to that described above.

FIG. 8 shows an exemplary database structure 800 that may be implemented as database 116 and/or 118 of FIG. 1, database 224 of FIG. 2 or storage device 716 of FIG. 7. Database structure 800 may be implemented as an analytic, management, operational, flat-file, rational, or hierarchical database in a standalone, network, or distributed configuration or as part of a database management system (DBMS) that interact with the user, other applications, and the database itself to capture and analyze data for use in loss control and preemptive claim management such as MySQL, MariaDB, PostgreSQL, SQLite, Microsoft SQL Server, Oracle, SAP, dBASE, FoxPro, IBM DB2, LibreOffice Base and FileMaker Pro. Database 800 includes a number of database column fields 810, 820, 830, 840 and 850 and a number of database rows 860, 862, 864 and 866. Column fields 810, 820, 830, 840 and 850 may correspond to one or more fields such as policy identifier, activity, location, coverage and policy or source(s). Generally, database structure 800 would tabulate the various in force policies that have been flagged with certain activities or issues from the crowd sourced data that has been accessed and analyzed. A certain policy identifier entry 870 such as an alpha numeric string corresponding to a certain in force policy may be associated with a certain activity entry 872, at a certain location entry 874, a certain coverage entry 876 that correspond to certain crowd source data 878.

Coverage field 840 may include individual, personal, and/or business insurance products offered by the insurance company. These products may include, for example, property insurance, general liability insurance, personal or commercial automobile insurance, workers' compensation insurance, captive insurance, commercial umbrella insurance, management and professional liability insurance, commercial marine insurance, employer-sponsored individual life insurance, and/or other products. The features described above may be used for the communication of information related to and/or the selection of insurance products that are applicable to all types of insurance consumers, including individuals, businesses, non-profit entities, governmental entities, and/or any other types of insurance consumers. For example, the features described above may be used for communication of information related to and/or the selection of individual insurance products, and/or any other insurance products.

The data from the fields shown in FIG. 8 may be input into rules and used with existing in force data to determine offers and recommendations. For example, based on the identification of motorcycle activity, the associated in force policy data may be accessed to determine if the in force policies include accidental death coverage. If accidental death coverage is included in the in force policy, then accidental death coverage may not be offered. However, if accidental death coverage is identified, then the rules may call for an offer or recommendation of an increase in the death benefit associated with accidental death coverage. Similarly, if the policy listed in row 866 includes long term disability coverage, but with an exclusion of disability from skydiving, then the insurance or business rules may cause a coverage recommendation to be generated for an endorsement or other modification of the in force policy to remove the exclusion. With respect to the identification of service of coffee, the rules may result in a review of a business liability insurance policy for limits appropriate for risks associated with hot liquids, for exclusions of hot liquids, and generation of corresponding offers for increase in limits or riders or other modifications to cover excluded risks.

Figure 9:
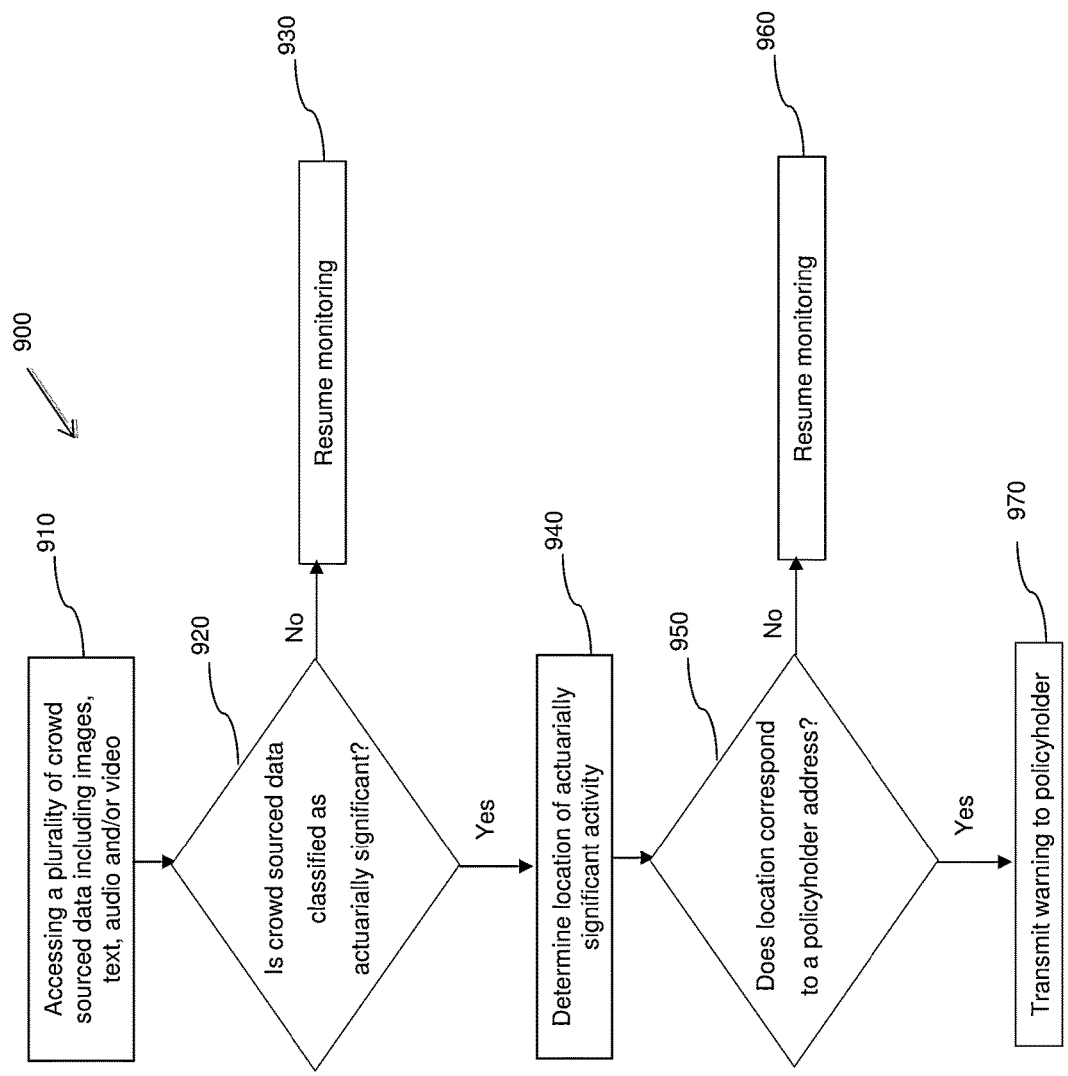
FIG. 9 shows an exemplary flow diagram according to an embodiment of the present invention.

FIG. 9 illustrates another exemplary computerized method 900 of the present invention. In one embodiment, the computerized method 900 includes accessing a plurality of crowd sourced data including images, text, audio and/or video, step 910. The plurality of crowd sourced data may be accessed on a single database, multiple databases, and/or a variety of distributed or virtual information repositories. The method continues with determining if the crowd sourced data is classified as actuarially significant, step 920. Determining if the crowd sourced data is classified as actuarially significant may include comparing the classification of the crowd sourced data with a database of known or likely actuarially significant activities and events to determine if there is a match between the crowd sourced data and one or more entries in the database. Such a database may be compiled and updated by, for example, an actuarial department of an insurance company or a vendor that compiles such information. If it is determined that the crowd sourced data is not actuarially significant then monitoring of the crowd sourced data is resumed, step 930. If it is determined that the crowd sourced data is actuarially significant, then the location of the actuarially significant activity is determined, step 940. The location may be determined by accessing location or geo coded information associated with the crowd sourced data such as meta data or other embedded data that is indicative of a certain location. It is then determined if the location corresponds to a policyholder address, step 950. This may be determined by comparing the location to one or more known policyholder addresses in an insurance database typically maintained by an insurance entity. If the location does not correspond to a policyholder address, then monitoring of the crowd sourced data is resumed, step 960. If the location corresponds to a policyholder address, then a warning is transmitted to the policyholder, step 970. Transmission may include compiling an electronic mail or text message and initiating a communication to the policyholder via a communication network such as the internet or cellular network.

The following is a representative pseudo code implementation of the computerized method of FIG. 9.

OPERATION Crowd Source
START
Define Variables
Access crowd source database DB_1
Validate data as actuarially significant
IF data is NOT actuarially significant
THEN Return to line 3
ELSE if data is actuarially significant, CALL Location Routine
END IF
LOCATION ROUTINE
Access location database
Validate location data
IF location data does not correspond to policyholder address
THEN return to line 3
ELSE
  CALL Transmit warning to policyholder routine
END IF
END In an embodiment, a system processor may access crowd-sourced data, identify data which is actuarially significant, and use the data as one or more values of variables in a formula. The system programming may provide that, responsive to the formula providing a value in excess of a threshold, or at least a threshold, a communication is provided to the insured. By way of example, actuarially significant circumstances may be classified in a plurality of classes depending on factors such as severity. In the following example, three classes of actuarially significant circumstances or events have been defined. Class 1 events are of the lowest severity; Class 2 events are of higher severity than Class 1 events. Class 3 events are of the highest severity. A TransmitWarning flag has a value of NO, and is set to YES if any one of the thresholds are met. The system is configured to proceed with transmission of the warning to the policyholder (or other designated recipient) upon detection of the TransmitWarning flag having a value of YES.

TransmitWarning(YES)IF: $Events_{Class1} \geq 5$
TransmitWarning(YES)IF: $Events_{Class2} \geq 3$
TransmitWarning(YES)IF: $Events_{Class3} \geq 1$ In another embodiment, values or scores are assigned to events or circumstances, and those scores may be compiled, added or other wise processed and then compared to one or more thresholds to determine whether a warning is to be transmitted to the policyholder or designee of the policyholder. For example, in embodiments, the following formula may be employed to determine a warning value:

$$\text{Warning Value} = a(Events_{Class1}) + b(Events_{Class2}) + (Events_{Class3})$$

Where $Events_{Class1}$, $Events_{Class2}$, and $Events_{Class3}$, respectively are the number of events in each applicable class. The factors a, b, and c respectively are weighting factors applied to the numbers of events in each class to determine a warning value. In embodiments, different weighting factors may be applied to events within a same class depending on additional factors, such as recency of the event. By way of example, the factors may have their full value for events no more than 1 month before the calculation, ⅔ of their value for events from 1 month to 2 months before the calculation, and ⅓ of their value for events from 3 months to 2 months from the date of calculation.

In an embodiment, a policyholder may be provided, at application, at renewal, and/or at one or more times during the policy term, an option to opt-in to the monitoring and warning transmission system of embodiments of the invention. The opt-in option may be accompanied with a request for access to one or more social media accounts of the policyholder. The request for access may include requests to provide identification of Twitter and Instagram accounts to facilitate following of the accounts by a system operated by or on behalf of an insurance entity, or requests to accept requests for connections (e.g., Facebook friend requests). In this embodiment, the policyholder must act affirmatively to activate the monitoring and warning transmission system of embodiments of the invention. If the policyholder does not opt in, then the default option remains in effect, in which the monitoring and warning transmission system of embodiments of the invention is not active for the policyholder. The system may be configured to calculate a premium to include a discount, determined on a basis such as a percentage basis or a fixed dollar reduction basis, for a policy based on the policyholder's selection of an opt-in option. A system according to embodiments of the invention may be configured to permit a user who has opted in to choose to opt out at any time, or at one or more available times, during a policy term. A system may be configured to determine a discount on a pro rata basis for a portion of a policy term upon policyholder opt out.

In an embodiment, a policyholder may be provided, at application, at renewal, and/or at one or more times during a policy term, an option to opt out from the monitoring and warning transmission system of embodiments of the invention. In such an embodiment, the default policy will include the monitoring and warning transmission system of embodiments of the invention, and associated discount or discounts or other benefits associated with the insurance policy or insurance policies.

Figure 10:
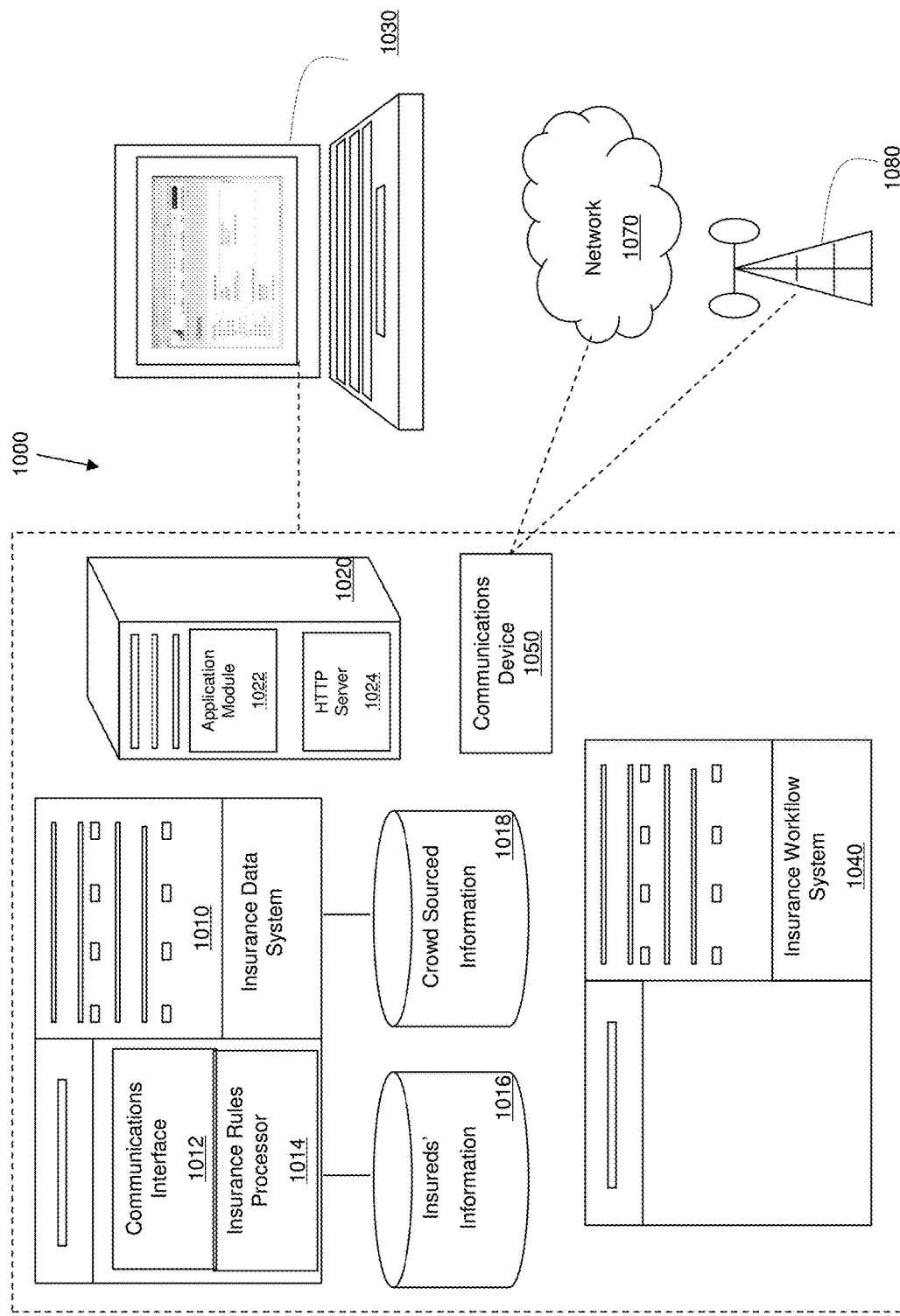
FIG. 10 shows an exemplary system that may be used for the management and analysis of crowd sourced data and management of insurance workflows.

Referring to FIG. 10, an exemplary computer system architecture 1000 that may be used for loss control and the predictive administration and management of insurance claims using crowd sourced data. The example architecture 1000 includes an insurance data system 1010, which may be similar to insurance data system 110 of FIG. 1, a web system 1020, which may be similar to web system 120 of FIG. 1, an insurance terminal 1030, which may be similar to insurance terminal 1030 of FIG. 1, and network 1040, which may be similar to network 140 of FIG. 1. Insurance data system 110 may include a communications interface 1012, an insurance rules processor 1014, an insureds information database 1016 and crowd sourced information database 1018 that comprise an insurance company subsystem 1060.

Computer system architecture 1000 may further include insurance workflow computer system 1040 in communication with the insurance data system 1010. The insurance workflow computer system 1040 may be configured to receive, from the insurance data system 1010, data indicative of an electronic communication issued to a policyholder in response to the identification of one or more actuarially-significant circumstances. The electronic communication may include at least one of a loss control message and an offer for additional insurance coverage. In embodiments, the data indicative of the electronic communication may include a copy of the electronic communication, or one or more data items included in the electronic communication.

The insurance workflow computer system 1040 may be configured, such as through execution by one or more computer processors of computer-readable program instructions, responsive to receipt of data indicative of an electronic communication, or data indicative of a determination by the insurance data system 1010 of one or more actuarially-significant circumstances, to determine whether one or more insurance-related workflow modifications are to be implemented, and to provide instructions for the workflow modifications. Examples of workflows to be modified may include a new policy workflow, a policy rider or endorsement workflow, a policy renewal workflow, and a claims workflow. Workflow modifications may include initiating a workflow, modifying a workflow by changing data employed in premium calculation or other terms such as deductibles and limits, determining whether a property inspection or other further review of property insured or to be insured under a policy is warranted, determining whether additional review of documentation related to an insurance policy, claim or application for insurance is required as part of a workflow, and other workflow modifications.

The insurance company subsystem 1060 further includes communication device 1050 which may include one or more hardware switches, routers, and other devices configured for bidirectional communication of data. Communication device 1050 is configured for communication of data, including electronic communications and workflow determinations, to insurance terminal 1030, which may be operated by or on behalf of insurance company personnel, and to network 1070 and/or wireless network 1080, for communication to devices of policyholders, claimants, applicants for insurance and others.

Although the methods and features described above with reference to FIGS. 1-10 are described above as performed using the example architecture 100 of FIG. 1 and the exemplary system 200 of FIG. 2, the methods and features described above may be performed using any appropriate architecture and/or computing environment. Although features and elements are described above in particular combinations, each feature or element can be used alone or in any combination with or without the other features and elements. For example, each feature or element as described with reference to FIGS. 1-10 may be used alone without the other features and elements or in various combinations with or without other features and elements. Sub-elements of the methods and features described above with reference to FIGS. 1-10 may be performed in any arbitrary order (including concurrently), in any combination or sub-combination.

What is claimed is:

1. A system for intelligently compiling and assessing Internet crowd sourced data to proactively identify and alert policy holders of actuarially-significant events, the system comprising:
   a data storage device configured to store crowd sourced data and policy data;
   at least one processor coupled to the data storage device;
   a communications interface unit coupled to the at least one processor;
   a memory coupled to the at least one processor;
   and one or more programs, wherein the one or more programs are stored in the memory and configured to be executed by the at least one processor, the one or more programs including instructions for:
      accessing, by the communications interface unit, crowd sourced data on a plurality of crowd sourced data sources on the Internet, said crowd sourced data including at least one of picture data, video data, and text data, wherein some or all of the crowd sourced data includes metadata indicating a location corresponding to the crowd sourced data;

storing the crowd sourced data on the data storage device;

evaluating, by a rules processor configured to apply one or more computerized predictive models, the crowd sourced data to detect one or more actuarially-significant events; and for each one of the one or more actuarially-significant events:

classifying a severity level for each of the detected actuarially-significant events comprising one of a class 1 severity, class 2 severity, and class 3 severity, wherein events having the class 3 severity have a highest severity;

executing a location routine to perform the steps of:

determining location data for a location associated with one or more crowd sourced data items associated with the detected one of the actuarially-significant events based upon metadata associated with the one or more crowd sourced data items; and correlating the location data associated with the detected one of the actuarially-significant events with policy data in the data storage device corresponding to an in force coverage policy by comparing the location data with address data associated with in-force coverage policies to determine a policyholder associated with the detected actuarially-significant event;

determining a positive or negative transmit warning flag value associated with the determined policyholder based on factors including a number of detected actuarially-significant events in each of the severity classes and weighting factors applied to at least some of the number of detected actuarially-significant events in each of the severity classes, the weighting factors dependent at least on recency of the detected actuarially-significant event; and generating, for policyholders having a determined positive transmit warning flag value, for transmittal by the communications interface unit to an address associated with a policyholder computing device based on the actuarially-significant event, an electronic communication including a loss control message corresponding to one or more actuarially-significant events associated with the policyholder;

wherein the loss control based message triggers a claims workflow process related to a first notice of loss;

wherein the claims workflow process comprises initiating a claims adjuster process; and wherein the claims adjuster process uses the crowd sourced data at least in part to determine a potential claim payment to be made to at least one policyholder.

2. The system of claim 1, wherein the location based data comprises geotag data.

3. The system of claim 1, wherein the location based data is correlated to an address of a policyholder.

4. The system of claim 3, wherein the policyholder address includes a physical address.

5. The system of claim 3, wherein the policyholder address includes an electronic address.

6. The system of claim 5, wherein the electronic communication via the system is sent to the electronic address of the policyholder.

7. The system of claim 6, wherein the electronic address is a mobile phone number and the electronic communication is a text message.

8. The system of claim 1, wherein issuing an electronic communication via the system further comprises providing a recommendation of one or more coverages related to the crowd sourced data.

9. The system of claim 1, further comprising offering the listed policyholder one or more additional coverages based on the one or more instances of activities.

10. A computer system for processing crowd sourced data for proactively identifying and alerting policy holders of actuarially significant circumstances, comprising:

an insurance data computer system comprising:

a data storage device configured to store crowd sourced data;

one or more computer processors coupled to the data storage device, a communications interface unit coupled to the one or more computer processors; and a computer usable medium, accessible by the one or more computer processors, having a computer readable program code embodied therein, said computer readable program code adapted to be executed to implement a method for identifying actuarially-significant circumstances, said method comprising:

compiling, by the communications interface unit, crowd sourced data on a plurality of real time crowd sourced data sources on the Internet, said crowd sourced data including at least one of images data, text data, and video data, wherein some or all of the crowd sourced data includes metadata indicating a location corresponding to the crowd sourced data;

evaluating, by a rules processor configured to apply one or more computerized predictive models, the crowd sourced data to detect one or more actuarially-significant events; and for each one of the one or more instances of actuarially significant events:

classifying a severity level for each of the detected actuarially-significant events comprising one of a class 1 severity, class 2 severity, and class 3 severity, wherein events having the class 3 severity have a highest severity;

executing a location routine to perform the steps of:

determining location data for a location associated with one or more crowd sourced data items associated with the detected one of the actuarially-significant events based upon metadata associated with the one or more crowd sourced data items;

correlating the location data associated with the detected one of the actuarially-significant events with policy data in the data storage device corresponding to an in force insurance policy by comparing the determined location data with address data associated with in-force insurance policies to determine a policyholder associated with the detected actuarially-significant event;

determining a positive or negative transmit warning flag value associated with the determined policyholder based on factors including a number of detected actuarially-significant events in each of the severity classes and weighting factors applied to at least some of the number of detected actuarially-significant events in each of the severity classes, the weighting factors dependent at least on recency of the detected actuarially-significant event; and generating, for policyholders having a determined positive transmit warning flag value, for transmittal by the communications interface unit to an address associated with a policyholder computing device based on the actuarially-significant event, an electronic communication to a policyholder under the in force insurance policy for the actuarially-significant events associated with the policyholder, wherein the electronic communication includes a loss control message; and an insurance workflow computer in communication with the insurance data system, the insurance workflow computer configured to:

receive data indicative of the electronic communication, trigger a claims workflow process related to a first notice of loss; and initiate a claims adjuster process;

wherein the claims adjuster process uses the crowd sourced data at least in part to determine a potential claim payment to be made to at least one policyholder.

11. The system of claim 10, wherein the electronic communication further includes an offer for additional insurance coverage comprising a rider for additional coverage.

12. The system of claim 10, wherein the electronic communication further includes an offer for additional insurance coverage comprising a stretch endorsement.

13. A computer-implemented method for intelligent automated assessment of crowd sourced data for identifying and alerting policy holders of actuarially-significant events:

accessing via a computer network by a communications interface unit, crowd sourced data on a plurality of crowd sourced data sources on the Internet, said crowd sourced data including at least two of images, text and video from a plurality of third party web sites, wherein some or all of the crowd sourced data includes metadata indicating a location corresponding to the crowd sourced data;

storing the crowd sourced data on a data storage device;

evaluating, by a rules processor configured to apply one or more computerized predictive models, the crowd sourced data to detect one or more actuarially-significant events;

for each one of the one or more actuarially significant events:

executing a location routine to perform the steps of:

classifying a severity level for each of the detected actuarially-significant events comprising one of a class 1 severity, class 2 severity, and class 3 severity, wherein events having the class 3 severity have a highest severity;

determining location data for a location associated with one or more crowd sourced data items associated with the detected one of the actuarially-significant events based upon metadata associated with the one or more crowd sourced data items;

correlating in the processor the determined location data associated with the detected one of the actuarially-significant events with policy data in the data storage device corresponding to an in force insurance policy by comparing the determined location data with address data associated with in-force insurance policies to determine a policyholder associated with the detected actuarially-significant event;

determining a positive or negative transmit warning flag value associated with the determined policyholder based on factors including a number of detected actuarially-significant events in each of the severity classes and weighting factors applied to at least some of the number of detected actuarially-significant events in each of the severity classes, the weighting factors dependent at least on recency of the detected actuarially-significant event; and generating, for policyholders having a determined positive transmit warning flag value, for transmittal by the communications interface unit to an address associated with a policyholder computing device based on the actuarially-significant event, via the computer network an electronic communication via an insurance claims system to a listed policyholder under the in force insurance policy for the actuarially-significant activity, wherein the electronic communication includes a loss control message corresponding to one or more actuarially-significant events associated with the policyholder;

wherein the loss control based message triggers a claims workflow process related to a first notice of loss;

wherein the claims workflow process comprises initiating a claims adjuster process; and wherein the claims adjuster process uses the crowd sourced data at least in part to determine a potential claim payment to be made to at least one policyholder.

14. The computer-implemented method of claim 13, wherein the actuarially-significant event comprise high risk activities that may result in damage to an insured property.

15. The computer-implemented method of claim 13, wherein the electronic communication further includes an offer for additional insurance coverage for one of a home automobile coverage, a home property coverage and a commercial coverage.

* * * * *